United States Patent

Arnold

Patent Number: 5,707,187
Date of Patent: Jan. 13, 1998

[54] CRANKSHAFT MILLING APPARATUS

[75] Inventor: Ned James Arnold, Midland, Mich.

[73] Assignee: Ingersoll, CM Systems, Inc., Midland, Mich.

[21] Appl. No.: 479,334

[22] Filed: Jun. 7, 1995

[51] Int. Cl.⁶ .................................................. B23C 3/06
[52] U.S. Cl. ........................... 409/200; 82/106; 451/249
[58] Field of Search ............................ 29/888.08; 409/197, 409/199, 200; 82/106

[56] References Cited

U.S. PATENT DOCUMENTS

| | | | |
|---|---|---|---|
| Re. 31,288 | 6/1983 | Matsuzaki et al. | 29/27 C |
| 2,662,438 | 12/1953 | Irtenkauf et al. | 82/106 |
| 3,793,687 | 2/1974 | Berbalk | 29/6 |
| 3,795,161 | 3/1974 | Berbalk | 82/9 |
| 3,880,025 | 4/1975 | Kralowetz et al. | 82/9 |
| 4,090,422 | 5/1978 | Berbalk | 82/1 C |
| 4,180,359 | 12/1979 | Schmid | 409/197 |
| 4,201,500 | 5/1980 | Kralowetz et al. | 407/43 |
| 4,208,156 | 6/1980 | Kraloweta et al. | 409/165 |
| 4,257,724 | 3/1981 | Blaimschein et al. | 409/232 |
| 4,276,794 | 7/1981 | Berbalk | 82/1 C |
| 4,305,689 | 12/1981 | Yamade et al. | 409/80 |
| 4,326,323 | 4/1982 | Kralowetz et al. | 29/6 |
| 4,337,011 | 6/1982 | Schmid | 409/199 |
| 4,375,670 | 3/1983 | Kralowetz et al. | 364/474 |
| 4,384,333 | 5/1983 | Maecker | 364/474 |
| 4,387,327 | 6/1983 | Kralowetz et al. | 318/573 |
| 4,388,027 | 6/1983 | Blaimschein | 409/131 |
| 4,423,990 | 1/1984 | Kodama et al. | 409/132 |
| 4,433,948 | 2/1984 | Kodama | 407/42 |
| 4,443,142 | 4/1984 | Blaimschein | 409/199 |
| 4,494,280 | 1/1985 | Blaimschein | 29/6 |
| 4,521,143 | 6/1985 | Schmid | 409/200 |
| 4,525,112 | 6/1985 | Blaimschein et al. | 409/199 |
| 4,607,550 | 8/1986 | Berbalk | 82/9 |
| 4,679,973 | 7/1987 | Kodama et al. | 409/200 |
| 4,681,491 | 7/1987 | Blaimschein | 409/200 |
| 4,774,746 | 10/1988 | Blaimschein | 29/26 A |
| 5,025,689 | 6/1991 | Mayer | 82/106 |
| 5,078,556 | 1/1992 | Schrod et al. | 409/132 |

FOREIGN PATENT DOCUMENTS

| | | | |
|---|---|---|---|
| 656747 | 4/1979 | U.S.S.R. | 409/199 |
| 1227345 | 4/1986 | U.S.S.R. | 82/106 |
| 696789 | 9/1953 | United Kingdom | 82/106 |
| 8904230 | 5/1989 | WIPO | 409/199 |

*Primary Examiner*—William R. Briggs
*Attorney, Agent, or Firm*—Fitch, Even, Tabin & Flannery

[57] ABSTRACT

A crankshaft milling apparatus is provided including a bed having a front and rear side. The bed includes a slanted portion on the rear side of the bed. A milling unit is pivotally mounted on the rear slanted portion of the bed with the milling unit carrying the internal milling cutter for encircling a crankshaft extending along the front side of the bed. The front side of the bed is open such that the milling cutter is easily accessible without having to climb into the machine.

18 Claims, 7 Drawing Sheets

CRANKSHAFT MILLING APPARATUS

FIELD OF THE INVENTION

The present invention relates to a crankshaft milling apparatus and, more particularly, to a crankshaft milling machine including a pivotable milling unit on a slanted bed portion of the machine.

BACKGROUND OF THE INVENTION

Machines for milling crankshaft main bearings and crankpins typically employ a ring-shaped cutting tool having cutting edges along the inner ring diameter, i.e., a rotating internal milling cutter. To mill a crankshaft, the rotary internal cutter surrounds the crankshaft and is caused to make a plunge cut and then travel through an orbital path to mill 360° about the circumference of the main or pin.

To provide such an internal milling cutter with its orbital motion, one commercially available crankshaft milling machine mounts the internal milling cutter on a cutter head. The cutter head is caused to move in a horizontal direction by a screw-driven cross slide positioned just above the bed but beneath the crankshaft to be milled. To tilt the milling unit, a vertical ball-screw drive is attached alongside the cutter head. The use of slides and guideways positioned beneath the crankshaft for movement of the cutter head can cause reliability problems as the slides and ways tend to wear over prolonged use and lose their tolerances precluding highly accurate machining. This is a particular problem as with crankshaft milling the machine generates heavy, interrupted cuts, abruptly exposing the bearing and way system to large loads. Such pounding action on the ways tends to rapidly deteriorate the way and bearing system. Another factor contributing to their wear, and possible malfunction, is that by positioning the slide below the crankshaft, chips generated during the milling process can access the guide surfaces. As such, covers for the slides are normally required. Thus, slide-based machines as described above require frequent maintenance.

U.S. Pat. No. 4,521,143 discloses an internal milling cutter in FIG. 5 (hereafter "the '143 patent"), having a milling unit pivotally mounted to a tilting unit which in turn is carried by and pivotally mounted to a longitudinal slide for axial positioning along the length of the crankshaft. The longitudinal slide is mounted for sliding movement on a horizontal bed having a space below the slide for a chip conveyor. The crankshaft to be milled is positioned above the aforementioned space but below the milling unit such that chips generated during the machining process fall down into the space onto the conveyor. To direct chips into the space, the bed has a funnel shape below the crankshaft in the bed such that chips generated during a crankshaft machining process are more precisely directed into the space and onto the conveyor.

To service the machine disclosed in the '143 patent, i.e., to change work rests, chuck jaws, workpiece cutters, etc., a worker must climb into the machine and precariously straddle the conveyor space on the slanted funnel walls in the horizontal bed to access the aforesaid equipment. This is particularly difficult as much of the equipment is fairly bulky and made from heavy metallic material. For example, the internal milling cutter can be made from steel and can have a twenty-four inch (24") diameter and be two inches (2") thick.

In the FIG. 5 embodiment of the '143 patent, the orbital motion of the internal milling cutter is caused by separate ball screw drives for the cutter head and tilting units. The tilting unit is pivoted about a pivot journal connecting it to the slide by a vertically arranged ball-screw drive alongside the cutter head and the cutter head is pivoted about a journal connecting it to the tilting unit by a horizontally arranged ball-screw drive positioned at the upper end of the cutter head. The ball-screw drives each include motors cantilevered outwardly from the screw relative to the machine for rotating the nut as by gearing or pulley means versus rotation of the screw, thereby requiring another bearing system which may cause lubrication problems as centrifugal rotation forces can cause the lubricant to be thrown outward from the ball nut.

SUMMARY OF THE INVENTION

In accordance with the present invention, a crankshaft milling apparatus for milling crankshafts is provided which overcomes the aforementioned problems of the prior art.

The crankshaft milling apparatus herein utilizes a milling unit that is pivoted without the use of slides and, correspondingly, covers for the same. By avoiding slides which tend to wear and lose their tolerances over time, the milling machine herein can provide more accurate machining over slide-based machines. This is particularly true where the slides are in a position to be exposed to chips generated during a machining process such as below the crankshaft to be milled.

In accordance with the present invention, the crankshaft milling apparatus includes a bed having a front and rear side. The bed includes a slanted portion on the rear side of the bed. A milling unit is pivotally mounted on the rear slanted portion of the bed with the milling unit carrying the internal milling cutter for encircling a crankshaft extending along the front side of the bed. The front side of the bed is open such that the milling cutter is easily accessible without having to climb into the machine as in the previously-described machine of the '143 patent. Thus, servicing of the machine herein is more easily accomplished by a worker without having to climb into the machine and dangerously position themselves along a slanted wall straddling over a space for machined chips.

The cutter head as used in the crankshaft milling machine of the present invention can be driven for orbital motion thereof by X and Y drives pivotally mounted to the cutter head at the rear side of the bed. This is in contrast to the milling unit of the '143 patent, which has its drives positioned over and alongside the bed.

In the crankshaft milling apparatus of the present invention, a slide carriage is mounted on the bed slanted portion. The milling unit includes a pivoted support member pivotally mounted to the slide carriage at one end of the support member and pivotally mounted to the cutter head at the other end of the support member. The carriage can slide along the rear side of the slanted portion of the bed to accurately position the milling unit, and specifically the milling cutter, around the crankshaft to be milled. Thus, similar to the X and Y drives, the slide is substantially removed and isolated from the work zone so as not to be exposed to chips generated during the machining of the crankshaft.

In accordance with another aspect of the invention, the pivoted support member includes a first pivot journal pivotally mounting the cutter head on the pivoted support member for pivoted movement. The X and Y drives are mounted on the slide and connected to the cutter head to pivot the cutter head on the journal and thereby to pivot the support member with the resultant of these movements causing the motion of the cutter head relative to the crankshaft. The X and Y drives can include X and Y linear screws each including a ball nut pivotally mounted on the cutter head for ball nut translation on the screws. Drives are provided for rotating the screws to translate the ball nut thereon. In this manner, direct rotation of the ball nut is avoided as is shown in the '143 patent. The drives can be motors for each screw with the motors being directly coupled onto the screw along the axis thereof for causing rotation of the screws. Again, this provides an advantage over the FIG. 5 embodiment of the '143 patent in that the motors are not cantilevered from the screws. The pivoted support member is pivotally mounted to the carriage by a second pivot journal. Thus, the cutter head can be driven in the X-direction about the second pivot journal by the X and Y drives without the provision of a drive directly connected to the pivoted support member.

In another form, the cutter head includes spaced end portions with the milling cutter supported in one end portion. The X and Y drives include linear ball screw drives having a ball nut mounted on a screw with the nuts each being pivotally connected to the cutter head at the other end portion of the cutter carriage. Drive structure is provided for causing each ball to traverse its respective screw and thereby pivot the support member about the second pivot journal and the cutter head about the first pivot journal.

DETAILED DESCRIPTION OF PREFERRED EMBODIMENT

Figure 1:
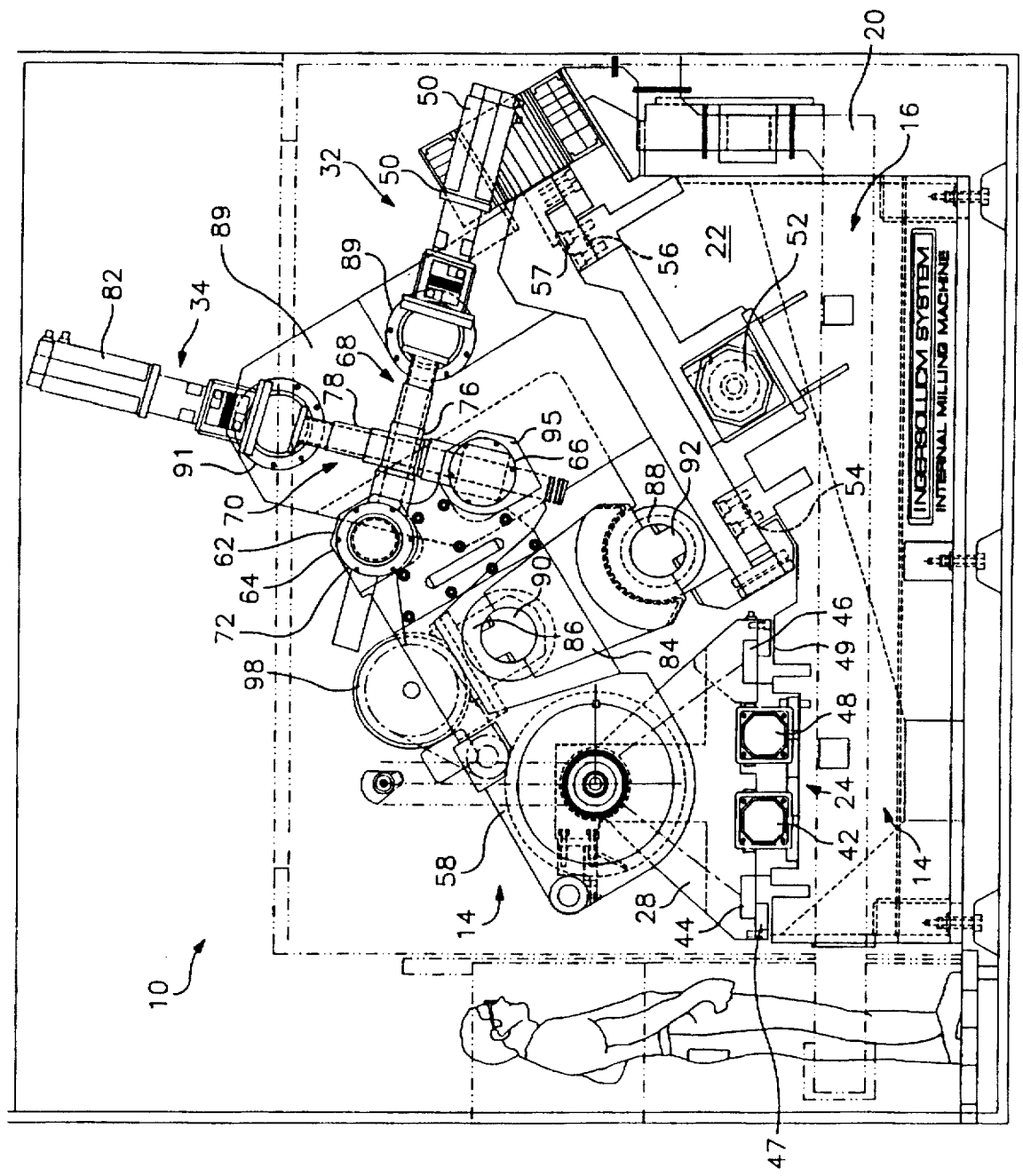
FIG. 1 is a side elevation view of the crankshaft machining apparatus according to the present invention having one of the pair of milling units of the apparatus removed to more clearly illustrate the other of the pair of milling units of the apparatus.
Figure 2:
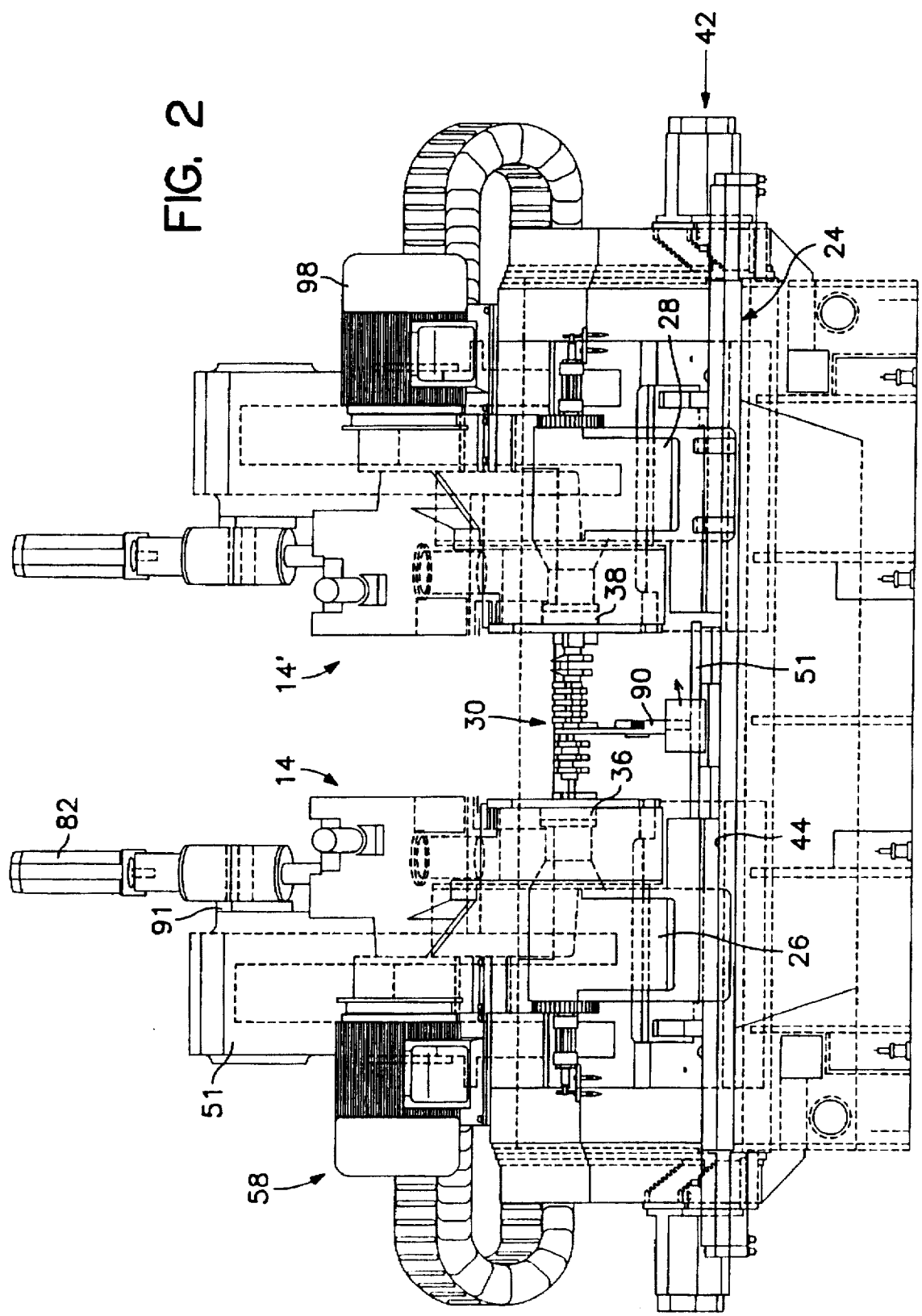
FIG. 2 is front elevation view of the crankshaft machining apparatus of FIG. 1 illustrating both milling units of the apparatus.

FIG. 1 illustrates a crankshaft milling apparatus 10 according to the present invention. The crankshaft milling apparatus 10 includes an internal milling cutter 12 carried on a milling unit generally designated 14. Preferably, the crankshaft milling apparatus 10 includes two mirror-image milling units 14 and 14', as illustrated in FIG. 2, such that multiple crankpins or mains can be machined simultaneously. As the milling units 14 and 14' are mirror-image, only the milling unit 14 will be described herein.

The crankshaft milling apparatus 10 of the present invention includes a bed 16 having a front and rear side, 18 and 20, respectively. At the rear side 20 of the bed 16, a slanted or angled portion 22 is provided. The milling unit 14 is pivotally mounted on the rear slanted portion 22 so that it extends from the rear side 20 of the bed 16 to the front side 18 projecting the internal milling cutter 12 over the front side 18.

Figure 3:
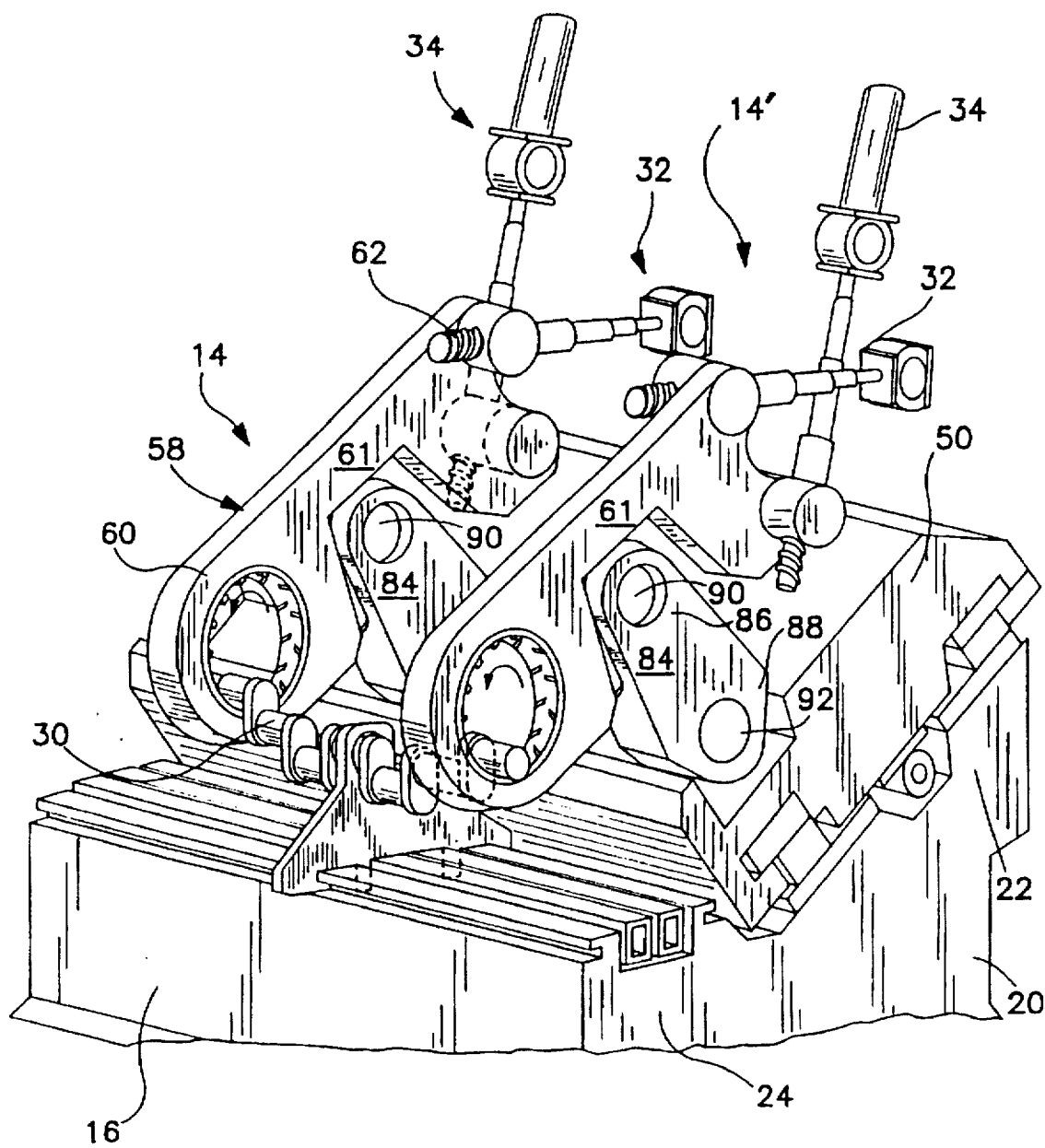
FIG. 3 is a perspective schematic view of the crankshaft milling apparatus of FIG. 1 with portions thereof removed to more clearly illustrate the mounting of the pivotable milling units to a slanted rear bed portion of the machine.

The bed front side 18 is provided with a horizontal flat portion 24 on which a moveable headstock 26 and tailstock 28 are mounted for supporting a crankshaft 30 over the flatbed portion 24, as seen in FIGS. 2 and 3. Thus, the milling cutter 12 is easily accessible to a worker without having to climb into the crankshaft milling apparatus 10 as with the previously-described pivoted milling unit as the front side 18 of the bed 16 is completely open.

To pivot the milling unit 14, X and Y drives, 32 and 34, are provided. Both drives 32 and 34 are pivotally connected to the milling unit 14 at the rear side 20 of the bed 16 and cooperate to cause the milling unit to pivot and ultimately effect orbital motion of the milling cutter 12 to mill the crankshaft 30. With the pivoting of the milling unit 14, ways or slides as used with prior milling units to effect orbital cutting are avoided. As previously mentioned, such slides tend to wear over time as they bear fairly large loads and potentially can be exposed to work chips generated during the machining of a crankshaft. By providing the slanted portion 22 carrying the milling unit 14 pivoted by the X and Y drives, 32 and 34, the use of slides for pivoting the milling unit 14 is avoided while still allowing for easy access to the front of the machine 10 for servicing of the same.

Referring to FIGS. 1-3, the crankshaft milling apparatus 10 of the present invention will be more fully described. Although the machine 10 of the present invention is capable of machining multiple mains simultaneously as by gang milling, the description herein focuses on the milling of a pin by the milling unit 14. To mount the crankshaft 30 between the headstock 26 and the tailstock 28, a gantry-type toploader (not shown) can be utilized, as is known in the art. The toploader positions the crankshaft 30 between the stocks 26 and 28 so that the crankshaft 30 can be held in stationary position by chucks 36 and 38. Although the headstock 26 may be stationary with the tailstock 28 being repositionable, preferably both translate on slides with their movement capable of being programmed to reduce downtime during crankshaft changeover. To move the stocks 26 and 28 and the steady rest 40, servo motors can be used. As seen in FIG. 1, servo motor 42 drives tailstock 28 on slides 44 and 46 to any position along the front side 18 of the bed 16 whereupon the tailstock 28 is clamped down on the slides 44 and 46 as by hydraulic clamps 47 and 49.

After the crankshaft 30 is chucked up, a steady rest 40 can be positioned on a main next to a pin to be milled to fix the crankshaft 30 at three points. The steady rest 40 provides improved rigidity to the shaft 30 by resisting forces generated during the cutting process which tend to deflect the crankshaft 30. The steady rest 40, similar to the tailstock 28, is driven by a servo motor 48 along slides 51 on the bed to any axial position along the length of the crankshaft 30 before being clamped into place.

When a crankshaft is not being milled, the milling unit 14 is in a retracted position above its corresponding head or tail stock chuck 36 or 38 for permitting crankshaft loading/unloading. To start the crankshaft milling operation, the milling unit 14 can be moved from its parked, retracted position along the axis of the crankshaft 30 to the correct working position along the axis where milling is to take place. For moving the milling unit 14 after the crankshaft 30 has been chucked-up, a slide carriage 50 mounted on the rear slanted portion 22 of the bed and mounting the milling unit 14 is provided. The slide carriage 50 includes a vertical portion 51 to which the X and Y drives, 32 and 34, are supported. The slide carriage 50 is driven by a servo motor 52 on slides 54 and 56 mounted on the bed slanted portion 22. Thus, the servo motor 52 controls the position of the milling unit 14 along the axial length of the crankshaft 30. Similar to the head- and tailstocks 26 and 28 and the steady rest 40, the slide carriage 50 can be clamped down onto the slides 54 and 56 as by hydraulic clamps 57 once it is properly positioned.

Figure 10:
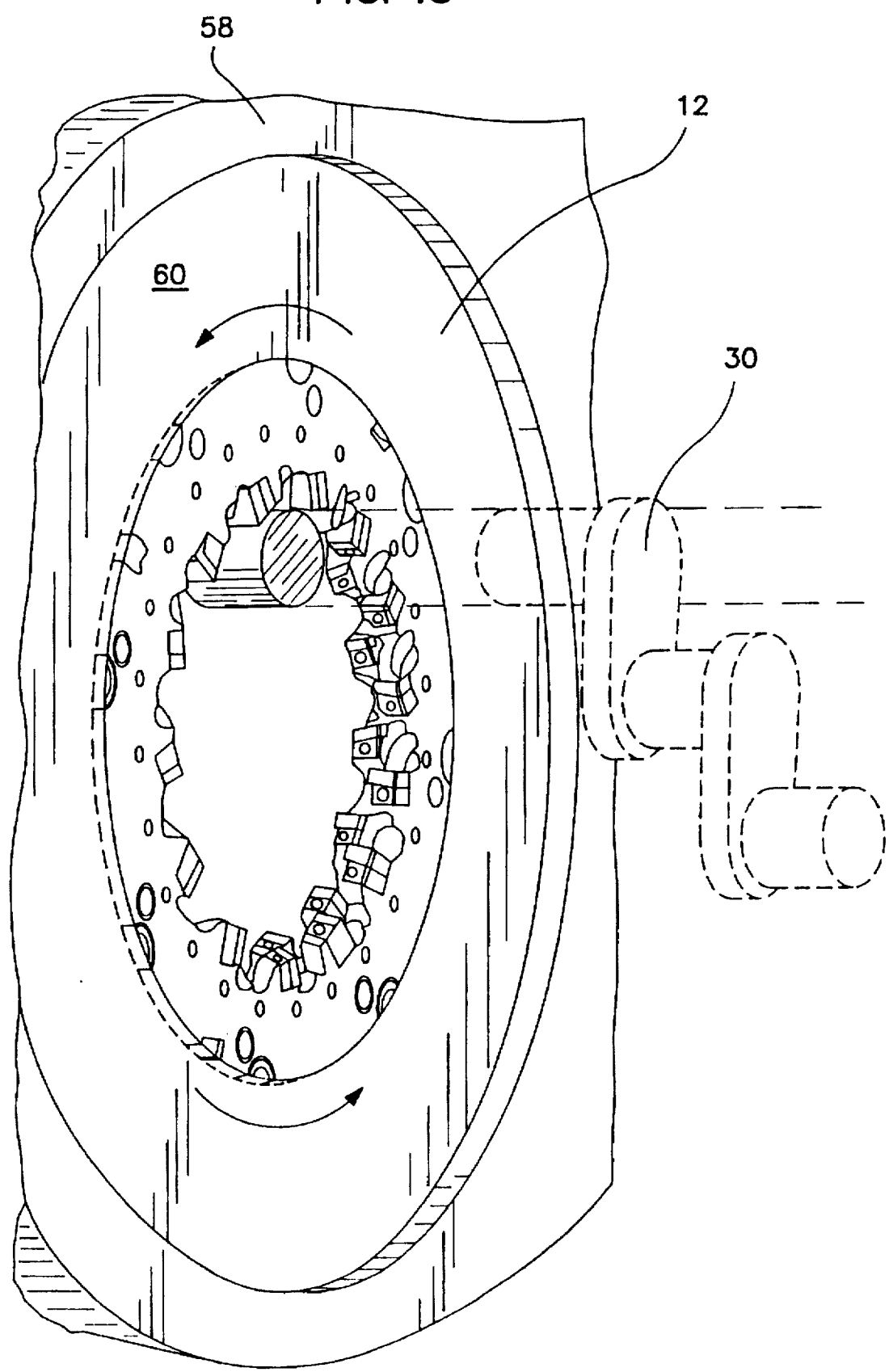
FIG. 10 is an enlarged perspective view of the milling cutter mounted in the cutter head.

The milling unit 14 is caused to undergo an orbital motion when the X and Y drives, 32 and 34, are activated. To this end, each of the cutter heads 58 is, as best seen in FIG. 3, a strong, plate-shaped member pivotally mounted on a pivoted link or support member 84 at its central, mid-portion 61 and its rearward end pivotally joined at trunnion ball mounts 72 and 74 to the respective X and Y drives 32 and 34. To obtain such orbital motion, the milling unit 14 consists of a cutter head 58 having a first front end 60 in which the rotary cutting tool 12 is mounted for rotation (FIG. 10) with the front end 60 projected over the front side 18 of the bed 16 and a second rear end 62 over the slanted portion 22 of the bed 16 to which the X and Y drives, 32 and 34, are pivotally connected. More specifically, ball-receiving troughs 64 and 66 are milled in the rear end 62 of the cutter head 58. The X and Y drives, 32 and 34, can be an X ball-screw drive 68 and a Y ball-screw drive 70, respectively. The X and Y ball-screw drives 68 and 70 each include ball nut mounts 72 and 74 mounted for reciprocating travel on respective screws 76 and 78. The ball nuts 72 and 74 are pivotally connected to the rear end 62 of the cutter head 58 in respective bearing and trough assemblies 64 and 66 approximately 8 inches in diameter as by trunnion pivots. The trough 64 is positioned above the trough 66 at the rear end 62 of the cutter head 58. Reversible servo motors 80 and 82 are directly coupled to their respective screws 76 and 78 for rotation thereof so that the motors 80 and 82 extend along the axes of the screws 76 and 78 without being cantilevered therefrom.

The pivoted link or support member 84 is pivotally connected to the slide carriage 50 and to the cutter head 58. The support member 84 has an upper end 86 and a lower end 88. A large 9-inch diameter, strong upper bearing and shaft assembly 90, approximately two feet in length (hereinafter "pivot shaft 90") pivotally connects the upper end 86 of the support member 84 to the cutter head 58 while a lower 9-inch diameter bearing and shaft assembly 92 approximately three feet in length (hereinafter "pivot shaft 92") pivotally connects the lower end 88 of the support member 84 to the slide carriage 50. The above-described bearings can be preloaded as by a 0.0005 inch interference fit while being sealed and lubricated as by grease fittings, thus providing the drives 32 and 34 with smooth movement while being rigidly supported for highly accurate orbital cutting versus machines which use slides to create an orbital motion as the slides deteriorate under the high load pounding forces, rapidly losing their tolerances, as previously described.

Thus, operation of the servo motors 80 and 82 causes the cutter head 60 and the support member 84 to smoothly pivot about their respective pivot points with the resultant of these movements causing the orbital motion of the milling cutter 12 relative to the crankshaft 30.

The orbital motion has X (horizontal) and Y (vertical) motion components. Generally, the X-drive 32 generates the X-component of the orbital motion movement of the cutter 12 by either pulling or pushing on the cutter head 58 at the upper rear end thereof causing the support member 84 to pivot about lower pivot shaft 92 and the milling unit 14, and therefore the cutter 12, to move generally horizontally. Likewise, the Y-drive 34 generally generates the Y-component of the cutter orbital motion by either pulling or pushing on the cutter head 58 to pivot about the support member 84 at the upper pivot shaft 90 thereof and therefore moving the cutter 12 generally vertically. Of course, due to the configuration of the milling unit 14 and the drives, 32 and 34, therefor, neither X or Y motion is entirely independent from each other as operation of the X-drive 32 alone can cause some Y-direction movement and thus movement of the ball nut on the screw of the Y-drive 34 and similarly operation of the Y-drive 34 alone can cause some X-direction movement in the cutter 12 and thus movement of the ball nut on the screw of the X-drive 32. As such, precise coordination of the operation of the X and Y drives, 32 and 34, to obtain the orbital motion is effected by a controller (not shown) which can be programmed to continually interpolate the movements between the two drives for accurate machining.

Figure 4:
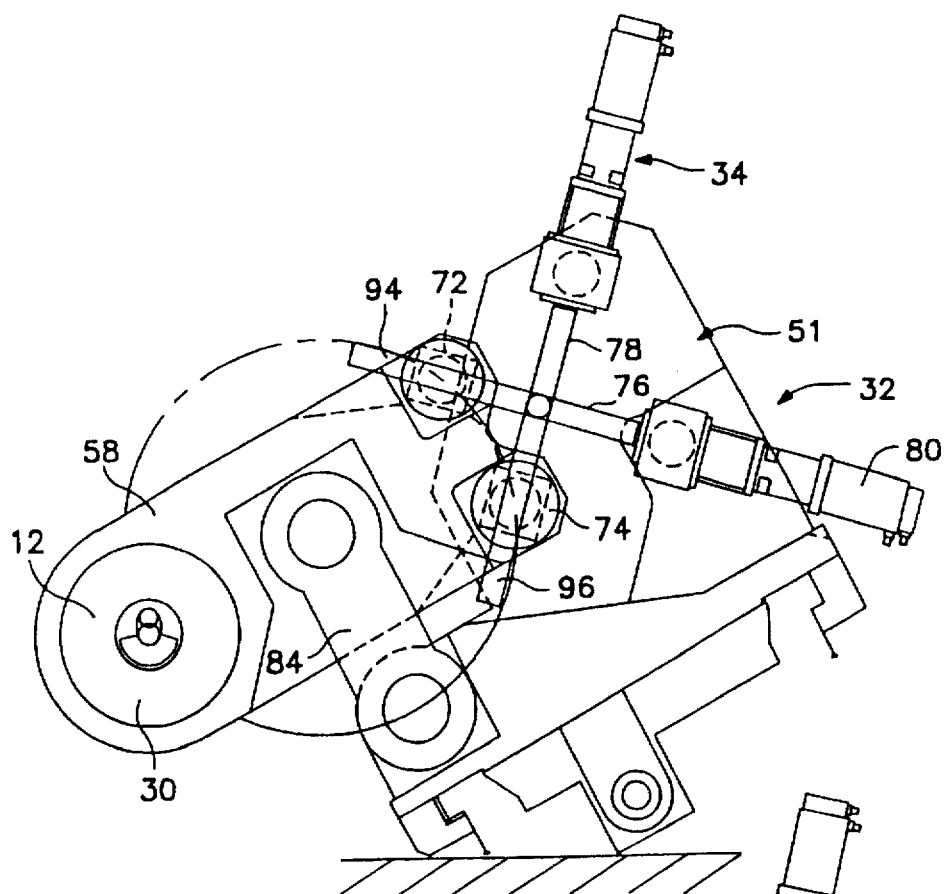
FIG. 4 is a schematic view of the milling unit carrying a milling cutter in the home position with a crankshaft extending therethrough.

To more specifically describe the operation of the milling machine 10 and the orbital motion of the internal milling cutter 12, reference is made to FIGS. 4 through 9 illustrating the milling of the 360° circumference of a pin. FIG. 4 illustrates a home position with the X and Y drives, 32 and 34, positioning the cutter head 58 such that the crankshaft 30 is centered in the internal milling cutter 12. In this position, the screws 76 and 78 extend perpendicular to one another. As will be apparent, the angle between the screws 76 and 78 constantly changes as a result of synchronized movement of the X and Y drives 32 and 34 in causing the orbital motion of the milling cutter 12 described below. The drives 32 and 34 are each mounted to the frame portion 51 of the carriage for pivotal movement by rotatable bearing and pivot trunnions 89 and 91 that allow the drive motors 80 and 82 to pivot relative to the frame portion 51. The screws, 76 and 78, each include portions, 94 and 96, respectively, extending away from the point at which the screws 76 and 78 cross one another at cross mount sleeves 95 towards the cutter head 58 upon which the nuts, 72 and 74, can reciprocate. In the home position, the nuts, 72 and 74, are at an intermediate position along the X and Y screw portions, 94 and 96, respectively.

Figure 5:
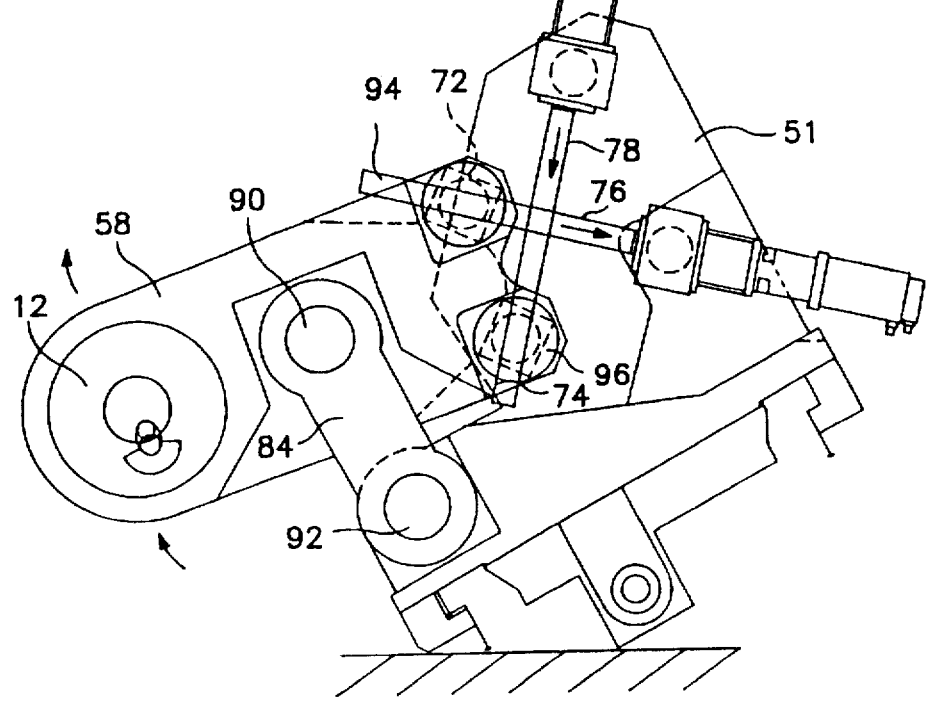
FIG. 5 is a schematic view similar to FIG. 4 with the milling cutter in a plunge cut position.

To start the milling process, a rotary feed motor 98 for the milling cutter 12 is started to generate rotary motion of the cutter 12 whereupon a plunge cut can be made. To make the plunge cut, the milling cutter 12 is caused to move upward in the vertical Y-direction with the cutter head 58 pivoting about the upper pivot shaft 90 of the support member 84 and the support member 84 slightly pivoting about its lower pivot shaft 92 to the left in a counterclockwise direction, as seen in FIG. 5. To make such a motion, drives, 80 and 82, are activated so that the ball nut 74 is caused to traverse the screw 78 towards the end of the screw portion 96 while the ball nut 72 traverses the screw portion 94 towards the point where the screws 76 and 78 cross.

Figure 6:
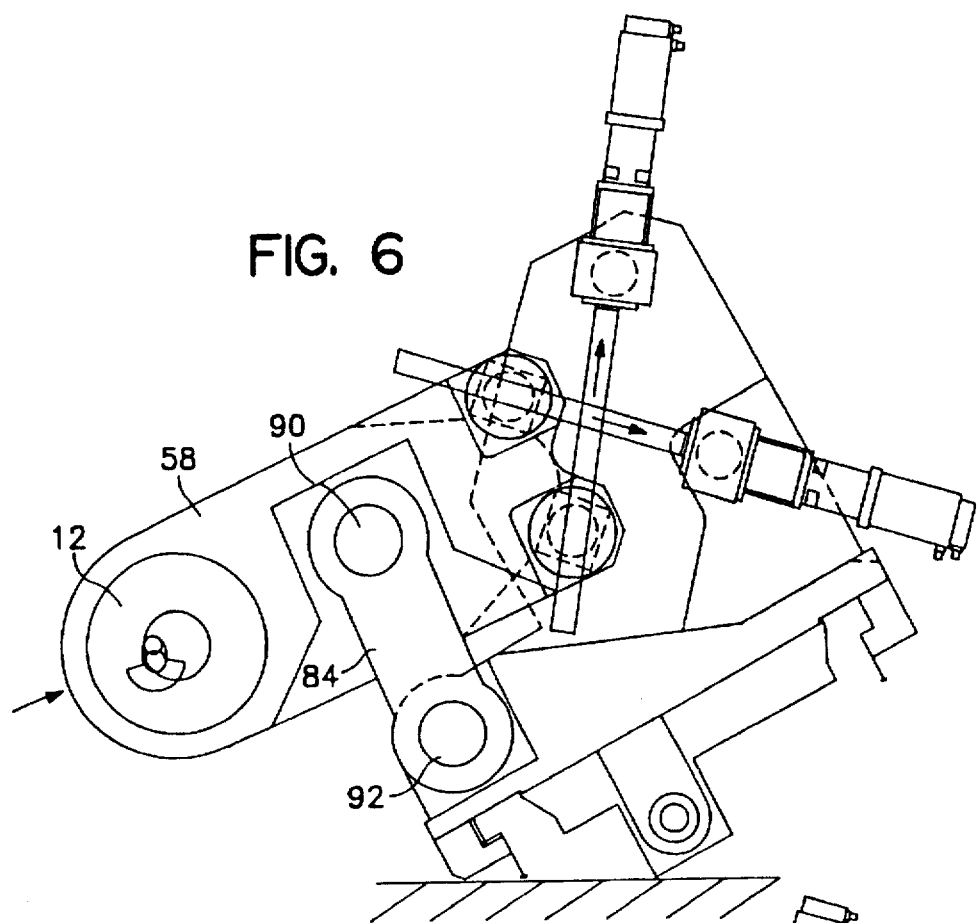
FIG. 6 is a schematic view similar to FIG. 4 wherein the milling cutter is rotated 90° about the crankshaft.

Thereafter, the milling cutter 12 travels through its orbital path. FIGS. 6 through 9 illustrate the position of the milling cutter 12 at 90° intervals about the pin being machined in its orbital motion. Thus, the milling cutter 12 as illustrated in FIG. 6 is rotated 90° from its plunge cut position as seen in FIG. 5. At the 90° position, the support member 84 is pivoted in a clockwise direction about the lower pivot shaft 92 to move the milling cutter 12 to the right in the X-direction. The drives 80 and 82 cause the ball nuts 72 and 74 to move towards the point where the screws 76 and 78 cross. In this manner, not only does the support member pivot about the lower pivot shaft 92 to move the milling cutter 12 to the right in the horizontal X-direction of movement but the cutter head 58 also pivots about the upper pivot shaft 90 to move the milling cutter 12 down in the Y-direction, as well, thus producing an arcuate clockwise path of movement for the cutter 12 from the FIG. 5 position to the FIG. 6 position.

Figure 7:
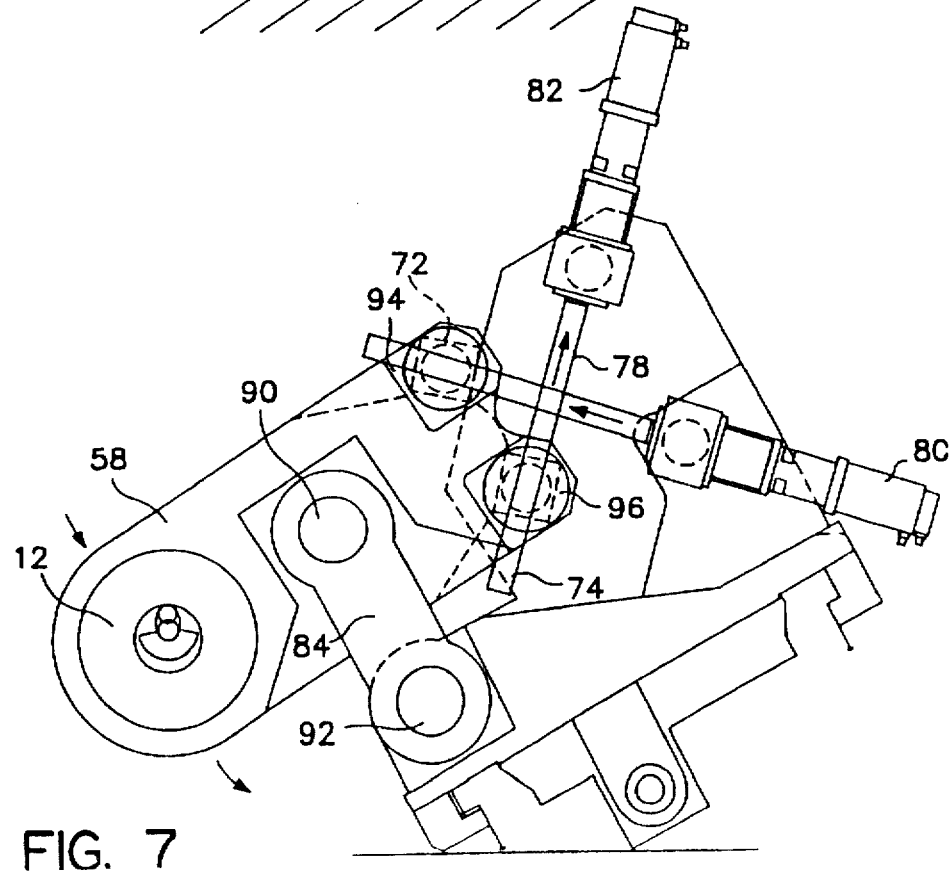
FIG. 7 is a schematic view similar to FIG. 4 wherein the milling cutter is rotated 180° from the plunge cut position about the crankshaft.

FIG. 7 illustrates the milling cutter 12 rotated 90° from the FIG. 6 position and 180° from the home position of FIG. 5 such that the milling cutter 12 is simultaneously moved downward in a vertical direction and to the left horizontally in an arcuate counterclockwise path. To effect such movement, the ball drive 80 causes the nut 72 to move outward along the screw portion 94 towards the end thereof while the drive 82 can rotate the screw 78 causing the ball nut 74 to move towards the crossing point of the screw 76 and 78 along the screw portion 96. In this manner, the support member 84 is pivoted about the lower shaft 92 in a counterclockwise direction to a position in alignment with its position in the home position (FIG. 4) to effect the X-direction component of the movement of the milling cutter 12 while the cutter head 58 is caused to pivot about the upper shaft 90 to effect the downward Y-direction of movement.

Figure 8:
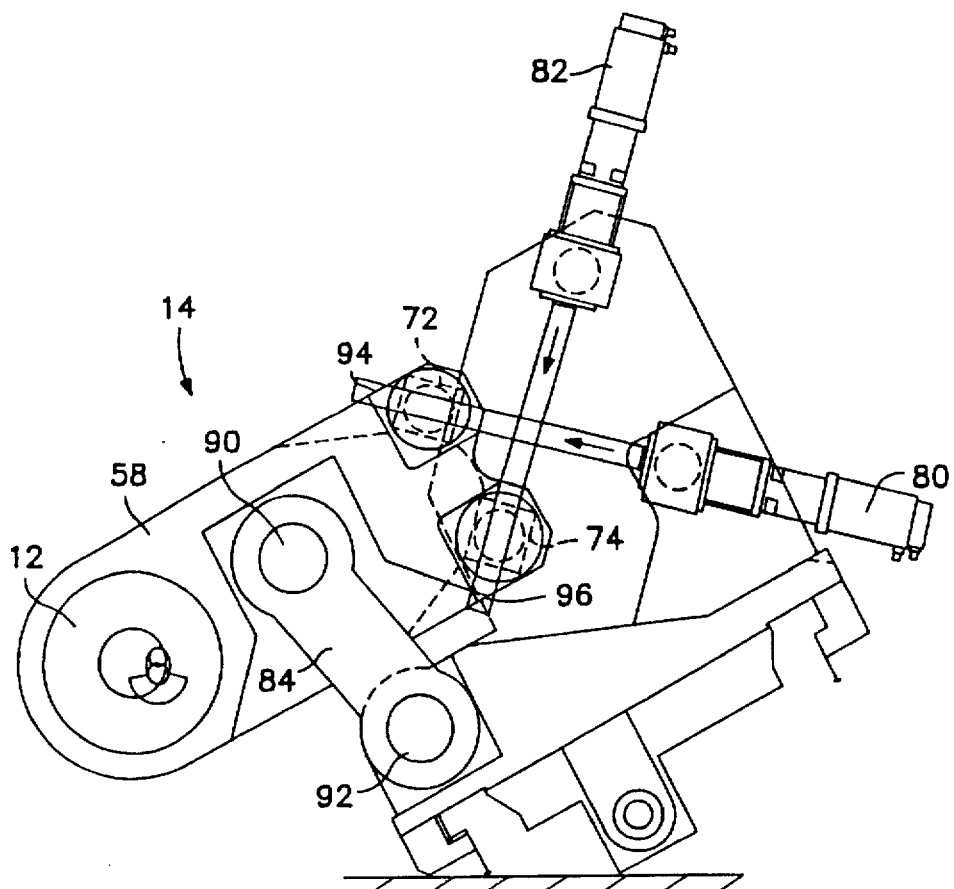
FIG. 8 is a schematic view similar to FIG. 4 wherein the milling cutter is rotated 270° from the plunge cut position about the crankshaft.
Figure 9:
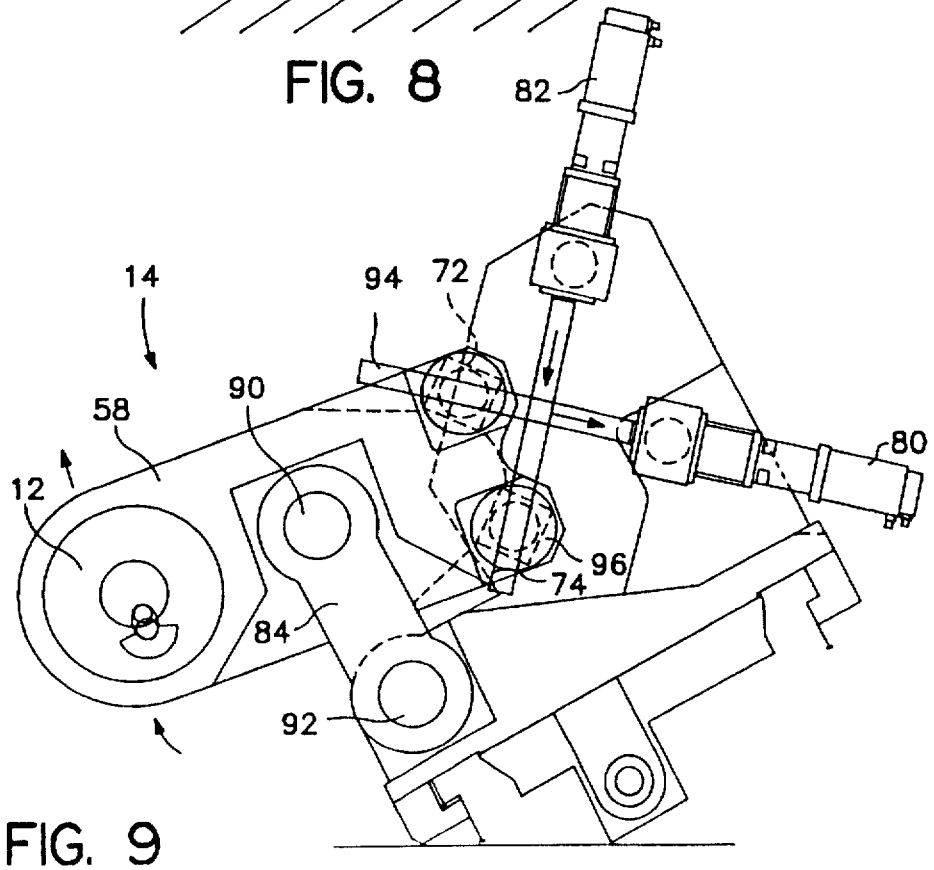
FIG. 9 is a schematic view similar to FIG. 4 wherein the milling cutter is rotated 360° from and back to the plunge cut position about the crankshaft.

FIG. 8 illustrates the milling cutter 12 moved 90° from the position of FIG. 7 and 270° from the position of the initial plunge cut in FIG. 5. To effect the orbital motion of the milling cutter 12, the ball screw drives 80 and 82 both cause their respective ball nuts 72 and 74 to move along the screw portions 94 and 96 towards the end thereof thereby causing the support member 84 to pivot about the lower shaft 92 in a counterclockwise direction to provide the milling unit 14 with an X-direction component of movement and causing the cutter head 58 to pivot about the upper shaft 90 to move the cutter 12 upwardly in the Y-direction. This causes the cutter 12 to travel in an arcuate counterclockwise path in its orbital movement from the FIG. 7 position to the FIG. 8 position. Finally, FIG. 9 is similar to FIG. 5 and illustrates the milling cutter having completed its orbital motion moved in a 90° interval from the position in FIG. 8 and 360° from the initial plunge cut position and, accordingly, back to this position, wherein the X-drive 80 causes the ball nut 72 to move along the screw portion 94 towards the crossing point of the screws and the Y ball-screw drive 82 causes the nut 74 to move along the screw portion 96 towards the end thereof. Thus the X-drive 80 causes the support member 84 to pivot in a clockwise direction moving the milling cutter 12 to the right in the X-direction while the Y ball-screw drive 82 causes the cutter head 58 to pivot about the upper shaft 90 causing upward Y-direction movement. The resultant of the above X and Y movements causes the cutter 12 to move in an arcuate clockwise path from the FIG. 8 position to the FIG. 9 position.

As previously mentioned, the orbital motion imparted by the X and Y drives 32 and 34 to the milling unit 14 is controlled by the controller for the drives 80 and 82 to synchronize proper movement of the ball nuts 72 and 74 with respect to one another. The controller can also operate to coordinate the drives 80 and 82 so as to pause a drive during a machining operation as both drives 32 and 34 need not be simultaneously turning, particularly as where the milling cutter 12 passes from one quadrant of movement to another, i.e., at the 90° intervals previously described, as precisely at those intervals there will be little movement in one of the X and Y directions such that only one of the X and Y drives need be moving and the other will be pausing.

The machine 10 described above provides for a highly accurate machining of crankshafts without the use of slides to affect orbital motion of the milling unit 14. Moreover, the machine 10 provides a pivotal milling unit 14 carrying the milling cutter 12 and mounted to a rear slanted portion 22 of the bed 16 extending therefrom to the front flat side 18 of the bed 16 with the cutter 12 projecting over the open front side 18 encircling the crankshaft 30 thus creating a more ergonomical machine in that the front side 18, and therefore the cutter 12 and associated crankshaft supports, are easily accessed for servicing such as to repair worn milling cutters 12 and to replace the same and chuck and steady rest jaws for crankshafts of differently-sized diameters.

While the invention has been described with regard to its preferred embodiments, which constitute the best modes known to the inventor, it should be understood that various changes and modifications may be made without departing from the scope and spirit of the invention which is intended to be set forth in the claims appended hereto.

What is claimed is:

1. A crankshaft milling apparatus comprising:
   a bed having an open front side;
   a slanted portion on the bed on a rear side of the bed;
   crankshaft holding devices mounted on the bed for holding a crankshaft at the open front side of the bed;
   a pivotable milling unit mounted on the rear slanted portion of the bed;
   a milling cutter carried by the milling unit and projected over the open front side and encircling a crankshaft to mill the same, the milling cutter being accessible from the open front side of the bed; and
   a plate-shaped cutter head member of the milling unit for carrying the milling cutter in a front end portion thereof with the plate-shaped cutter head member extending transversely to the crankshaft and extending from the rear of the bed to the open front side of the bed generally inclined along the slant of the rear side slanted portion of the bed so that only the front end portion of the cutter head member is disposed over the open front side of the bed.

2. The crankshaft milling apparatus of claim 1 in which chips generated during a crankshaft milling operation drop down into the front side of the bed.

3. A crankshaft milling apparatus comprising:
   a bed having an open front side;
   a slanted portion on the bed on a rear side of the bed;
   crankshaft holding devices mounted on the bed for holding a crankshaft at the open front side of the bed;
   a pivotable milling unit mounted on the rear slanted portion of the bed;
   a milling cutter carried by the milling unit and projected over the open front side and encircling a crankshaft to mill the same, the milling cutter being accessible from the open front side of the bed;
   a slide carriage mounted on the bed slanted portion for sliding movement along the rear side slanted portion of the bed; and X and Y drives pivotally mounted on the carriage and pivotally mounted to the milling unit at the rear side of the bed for driving and pivoting the milling unit for cutting of a crankshaft by the milling cutter carried thereby.

4. A crankshaft milling apparatus comprising:

a bed having an open front side;

a slanted portion on the bed on a rear side of the bed;

crankshaft holding devices mounted on the bed for holding a crankshaft at the open front side of the bed;

a pivotable milling unit mounted on the rear slanted portion of the bed;

a milling cutter carried by the milling unit and projected over the open front side and encircling a crankshaft to mill the same, the milling cutter being accessible from the open front side of the bed;

a cutter head carrying the milling cutter and extending transversely to a crankshaft held by the holding devices from the rear side to the front side of the bed, wherein the cutter head is driven by X and Y drives pivotally mounted to the cutter head at the rear side of the bed.

5. A crankshaft milling apparatus comprising:

a bed having an open front side;

a slanted portion on the bed on a rear side of the bed;

crankshaft holding devices mounted on the bed for holding a crankshaft at the open front side of the bed;

a pivotable milling unit mounted on the rear slanted portion of the bed;

a milling cutter carried by the milling unit and projected over the open front side and encircling a crankshaft to mill the same, the milling cutter being accessible from the open front side of the bed;

a cutter head carrying the milling cutter and extending transversely to a crankshaft held by the holding devices from the rear side to the front side of the bed, wherein a slide carriage is mounted on the bed slanted portion for sliding movement along the rear side slanted portion of the bed and the milling unit includes a pivoted support member pivotally mounted to the slide carriage at one end of the support member and pivotally mounted to the cutter head at the other end thereof.

6. The crankshaft milling apparatus of claim 1 wherein the crankshaft holding devices include a movable headstock and tailstock with the headstock and tailstock including crankshaft capturing chucks.

7. The crankshaft milling apparatus of claim 6 wherein the crankshaft holding devices further includes a movable steady rest between the headstock and tailstock for maintaining the crankshaft in a stationary position during a machining operation.

8. The crankshaft milling apparatus of claim 7 wherein the headstock, tailstock and steady rest are disposed on the front side of the bed and the steady rest and at least one of the headstock and tailstock are powered for movement along the bed front side.

9. The crankshaft milling apparatus of claim 1 in which a pair of pivoted milling units are each mounted on the rear slanted portion of the bed with the pair of milling units being spaced from each other along the rear bed side.

10. A crankshaft milling apparatus for milling crankshafts comprising:

a bed;

crankshaft holding devices mounted on the bed;

a milling cutter for encircling a crankshaft and for milling the encircled crankshaft;

a cutter head carrying the milling cutter and extending transversely to the crankshaft;

a slide carriage mounted on the bed for movement in a first direction parallel to the longitudinal crankshaft axis;

a pivoted support member for the cutter head mounted on the slide carriage and carried thereby;

a first pivot journal pivotally mounting the cutter head on the pivoted support member for pivoted movement; and X and Y drives mounted on the slide and connected to the cutter head to pivot the cutter head on the journal and thereby to pivot the support member with the resultant of these movements causing the motion of the cutter head relative to the crankshaft.

11. The crankshaft milling apparatus of claim 10 wherein each of the X and Y drives for the cutter head comprises a linear screw pivotally mounted on the slide and pivotally mounted on the cutter head.

12. The crankshaft milling apparatus of claim 11 wherein the X and Y linear screws extend transversely to each other and are capable of extending at an angle to each other that is other than a right angle during a crankshaft machining operation.

13. The crankshaft milling apparatus of claim 11 wherein the X and Y linear screws each include a ball nut pivotally mounted on the cutter head for translation on the screws and drive means for rotating the screws to translate the ball nut thereon.

14. The crankshaft milling apparatus of claim 13 wherein the drive means includes a motor for each screw with the motors being directly coupled to the screws along the screw axes for causing rotation thereof.

15. The crankshaft milling apparatus of claim 10 wherein the slide carriage includes drive means for moving the carriage in the first direction and clamping means for fixing the carriage in a plurality of different positions along the crankshaft axis in the first direction.

16. The crankshaft milling apparatus of claim 10 wherein the pivoted support member is pivotally mounted to the carriage by a second pivot journal.

17. The crankshaft milling apparatus of claim 16 wherein the cutter head includes spaced end portions with the milling cutter mounted in one end portion and the X and Y drives comprise linear ball screw drives each including a ball nut mounted on a screw with the nuts each being pivotally connected to the cutter head at the other end portion thereof and drive means for causing each nut to traverse its respective screw and thereby pivoting the support member about the second pivot journal and the cutter head about the first pivot journal.

18. The crankshaft milling apparatus of claim 10 where the bed has an open front side and a rear side including a slanted portion thereon with the carriage being mounted on the slanted rear portion to project the cutter head over the open front side encircling the crankshaft enabling the milling cutter to be accessible from the open front side of the bed.

* * * * *